(12) United States Patent
Moscaritolo et al.

(10) Patent No.: US 8,954,740 B1
(45) Date of Patent: Feb. 10, 2015

(54) SESSION KEY PROXY DECRYPTION METHOD TO SECURE CONTENT IN A ONE-TO-MANY RELATIONSHIP

(75) Inventors: Vincent E. Moscaritolo, Ashland, OR (US); Damon Cokenias, San Francisco, CA (US); David Finkelstein, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 448 days.

(21) Appl. No.: 12/897,563

(22) Filed: Oct. 4, 2010

(51) Int. Cl.
*H04L 29/06* (2006.01)

(52) U.S. Cl.
USPC ........... 713/171; 713/150; 713/151; 713/152; 713/153; 713/154; 713/182; 380/277; 380/278; 380/279; 380/280; 380/281; 380/282; 380/283; 380/284; 380/285; 380/286; 380/44; 380/45; 380/46; 380/47; 380/28; 380/29; 380/30

(58) Field of Classification Search
USPC .......... 713/171, 182, 150–154; 380/255–286, 380/44–47, 28–30
See application file for complete search history.

(56) References Cited

U.S. PATENT DOCUMENTS

| | | | | |
|---|---|---|---|---|
| 5,220,604 | A * | 6/1993 | Gasser et al. | 1/1 |
| 5,410,602 | A * | 4/1995 | Finkelstein et al. | 380/281 |
| 5,564,106 | A * | 10/1996 | Puhl et al. | 380/286 |
| 7,136,489 | B1 * | 11/2006 | Madhusudhana et al. | 380/277 |
| 2007/0091914 | A1 * | 4/2007 | Ashley | 370/462 |
| 2009/0013195 | A1 * | 1/2009 | Ochi et al. | 713/193 |
| 2009/0208004 | A1 * | 8/2009 | Kawai et al. | 380/45 |

* cited by examiner

*Primary Examiner* — Josnel Jeudy
(74) *Attorney, Agent, or Firm* — Lowenstein Sandler LLP

(57) ABSTRACT

A server receives identifying information of a user of a client device and data encrypted with a public key of a group, where the encrypted data includes an encrypted session key for secure content. The server determines whether the user is a member of the group using the identifying information of the user. If the user is a member of the group, the server decrypts the encrypted session key using a private key of the group, and causes the client device to obtain a session key to access the secure content.

20 Claims, 8 Drawing Sheets

SESSION KEY PROXY DECRYPTION METHOD TO SECURE CONTENT IN A ONE-TO-MANY RELATIONSHIP

FIELD OF INVENTION

Embodiments of the invention relate to data protection, and more particularly to a session key proxy decryption mechanism to secure content in a one-to-many relationship.

BACKGROUND OF THE INVENTION

To protect information, users often encrypt data using encryption software. When distributing secure content to members of a group, the secure content is typically encrypted using a session key, and then the session key is encrypted for each member using a public key of the member. Next, the encrypted content and the resulting sets of the encrypted session keys are provided to the members of the group.

The above conventional mechanism has several drawbacks. In particular, the sender of the secure content has to store public keys of all members of the group and has to perform a key lookup for every member each time the secure content is distributed to the group. For a large list of members, these operations require significant storage and processing resources. In addition, a recipient is aware of key identifiers (KeyIDs) of all the other recipients and may be able to determine who the other recipients are based on their KeyIDs. Further, the conventional mechanism does not allow a new member subsequently added to the group to decrypt encrypted content post-factum. Moreover, because the above mechanism requires an encrypted message to include approximately 700 bytes of ASCII text for each member's key, this mechanism is inapplicable to micro-blogging systems.

SUMMARY OF THE INVENTION

In an exemplary method of one embodiment, a server receives identifying information for a user of a client device and data encrypted with a public key of a group, where the encrypted data includes an encrypted session key for secure content. The secure content may be, for example, an electronic message, an attachment to the electronic message, a file, a virtual disk, a network share, web forum content, social network content, cloud content, etc. The identifying information of the user can be a public key of the user, an email address of the user, an IP address of the client device, an employee number of the user or any other information uniquely identifying the user. The server determines whether the user is a member of the group using the identifying information of the user. In one embodiment, the server determines whether the user is the member of the group by determining an identifier of a group key using the encrypted session key, and determining whether identifiers of members of the group include an identifier matching the identifying information of the user. If the user is a member of the group, the server decrypts the encrypted session key using a private key of the group, and then causes the client device to obtain a session key to access the secure content. If the user is not a member of the group, the server refrains from decrypting the encrypted session key.

In one embodiment, the server causes the client to obtain the session key by re-encrypting the session key using a public key of the user, and sending the re-encrypted session key to the client device, where the re-encrypted session key is to be decrypted using a private key of the user. In one embodiment, after the server decrypts the encrypted session key, it stores the session key in a cache. Subsequently, when the server receives the encrypted session key from another user, the server determine that the other user is a member of the group, retrieves the session key from the cache, and causes the other user to obtain the session key to access the secure content.

An exemplary non-transitory computer readable medium of one embodiment includes instructions which, when executed by a computing device, cause the computing device to perform a method that comprises receiving encrypted data at a client device, determining that the encrypted data includes a key identifier matching an identifier of a group public key stored on the client device, and identifying a server having a group private key for the encrypted data, the encrypted data including an encrypted session key for secure content. The method may further comprise sending the encrypted data and identifying information of a user of the client device to the server, receiving a response from the server, obtaining a session key using the response of the server, and decrypting the secure content using the session key.

In the exemplary non-transitory computer readable medium, determining that the encrypted data includes the key identifier matching the identifier of the group public key stored on the client device comprises, in one embodiment, determining that the client device does not include a user private key corresponding to the key identifier included in the encrypted data, and searching group public keys of the user for a group public key corresponding to the key identifier included in the encrypted data. In the exemplary non-transitory computer readable medium, the method further comprises, in one embodiment, identifying a public key of the user for a group represented by the group public key. In the exemplary non-transitory computer readable medium, in one embodiment, the response of the server includes the session key re-encrypted by the server using a public key of the user, and obtaining the session key using the response of the server comprises decrypting the re-encrypted session key using a private key of the user.

An exemplary system of one embodiment comprises a server to receive identifying information for a user of a client device and data encrypted with a public key of a group, wherein the encrypted data includes an encrypted session key for secure content, to determine that the user is a member of the group using the identifying information of the user, to decrypt the encrypted session key using a private key of the group, and to cause the client device to obtain a session key to access the secure content. In the exemplary system, in one embodiment, the server is to cause the client device to obtain the session key by re-encrypting the session key using a public key of the user, and sending the re-encrypted session key to the client device, the re-encrypted session key to be decrypted using a private key of the user.

In the exemplary system, in one embodiment, the server is to determine whether the user is the member of the group by determining an identifier of a group key representing the group, and determining whether identifiers of members of the group include an identifier matching the identifying information of the user. In the exemplary system, in one embodiment, the server is further to extract the session key after decrypting the encrypted session, to store the session key in a cache, to receive the encrypted session key from another user, to determine that the other user is a member of the group, to retrieve the session key from the cache, and to cause the other user to obtain the session key to access the secure content.

In one embodiment, the exemplary system further comprises a client device to receive encrypted data, to determine that the encrypted data includes a key identifier matching an identifier of a group public key stored on the client device, to identify the server, to send the encrypted data and the identifying information of the user to the server, to receive the response from the server, to obtain the session key using the response of the server, and to decrypt the secure content using the session key. In the exemplary system, in on embodiment, the client device is to determine that the encrypted data includes the key identifier matching the identifier of the group public key stored on the client device by determining that the client device does not include a user private key corresponding to the key identifier included in the encrypted data, and searching group public keys of the user for a group public key corresponding to the key identifier included in the encrypted data.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for facilitating the decryption of content in a one-to-many relationship are described. In one embodiment, secure content is encrypted using a session key, the session key is encrypted using a public key of a group, and the encrypted session key is communicated to members of the group. When a client receives the encrypted session key, it determines whether the encrypted session key has a key identifier matching an identifier of a group public key stored on the client. If so, the client identifies a server having a private key of this group, and sends the encrypted session key and a public key of a user of the client to the server.

In one embodiment, the server receives the encrypted session key and the public key of the user, and determines whether the user is a member of the group using the public key of the user. If the user is a member of the group, the server decrypts the encrypted session key using the private key of the group, and causes the client to obtain the session key to access the secure content. In one embodiment, the server causes the client to obtain the session key by re-encrypting the session key using the public key of the user, and sending the re-encrypted session key to the client. The client then decrypts the re-encrypted session key using a corresponding private key of the user.

With embodiments of the invention, a distributor of secure content is no longer required to store public keys of all group members and to perform a key lookup for every member each time the secure content is distributed to the group. In addition, the size of the encrypted message distributed to the group members is significantly reduced. Further, a member of the group that receives an encrypted session key for the secure content can no longer determine who the other recipients of the encrypted session key are, and a new member subsequently added to the group is able to decrypt the encrypted content post-factum.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
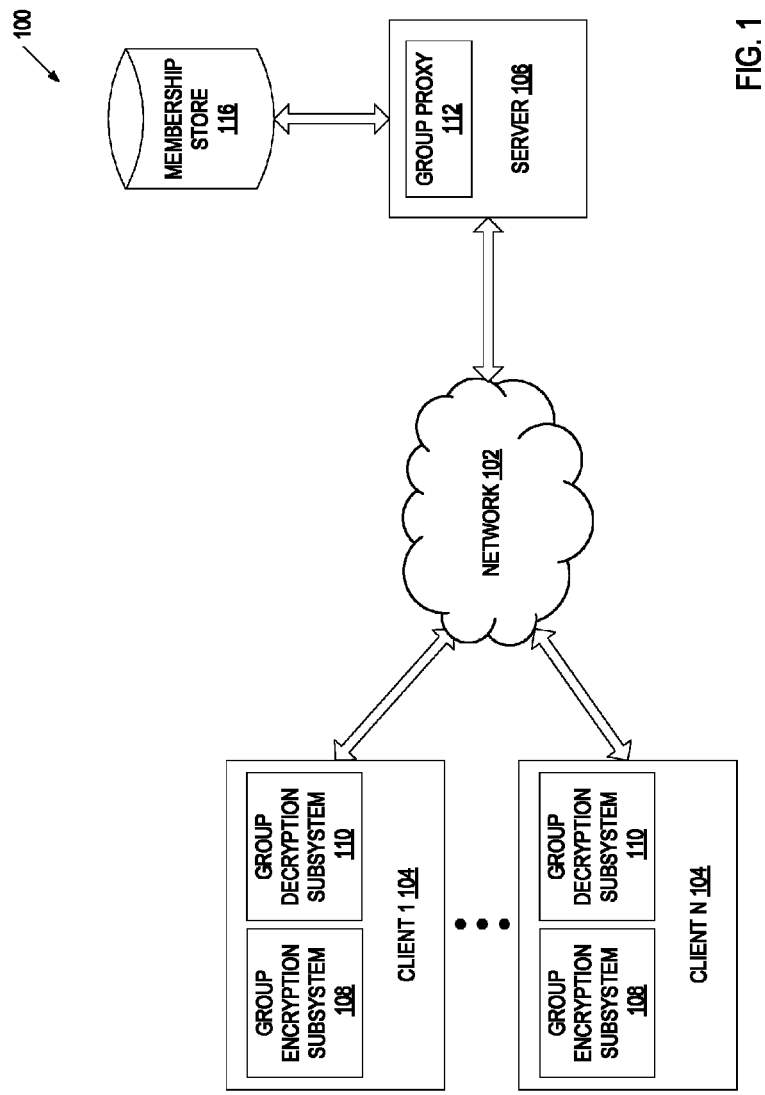
FIG. 1 illustrates an exemplary network architecture in which embodiments of the invention may operate.

FIG. 1 is a block diagram of an exemplary network architecture 100, in which embodiments of the present invention may operate. The architecture 100 includes multiple client devices 104 and a server 106 connected via a network 102. The network 102 may be a private network (e.g., local area network (LAN), wide area network (WAN), metropolitan area network (MAN), etc.), a public network (such as the Internet), or a combination thereof.

The server 106 may be a server computer system, a desktop computer system, a router, etc. Each client 104 may be a personal computer (PC), a laptop, a tablet computing device, a mobile phone, or any other computing device. A user of client 104 is a member of one or more groups and may receive secure content distributed to these groups. The secure content may be distributed as an electronic message (e.g., an email message, a web mail message, an instant messaging (IM) message, etc.), a webcast file, etc. Each client 104 may store a public key for each group of the user but not a corresponding private key. In addition, each client 104 stores one or more personal key pairs of the user. For example, a user may have a private and public key pair for work-related communications and a private and public key pair for family-related communications.

In one embodiment, all members of the group can send secure content to the other members. In this embodiment, each client 104 includes a group encryption subsystem 108 to encrypt content to be distributed to the group and a group decryption subsystem 110 to decrypt content received from other members. In another embodiment, not all the members can send secure content to the group. In this other embodiment, all clients include the group decryption subsystem 110 but only clients, which are authorized to distribute secure content to the group, include a group encryption subsystem 108.

The group encryption subsystem 108 is responsible for identifying secure content to be distributed to a group, encrypting this content with a session key, encrypting the session key with a public key of the group, and sending a message with the encrypted content and the encrypted session key to the group. A session key (also known as a traffic encryption key) represents any key that can be used to encrypt content as opposed to a key used to encrypt other keys (key encryption key). A session key may be a randomly generated key that is cryptographically strong. For example, the session key may contain 128 random characters (e.g., random Base 32 characters). The message sent to the group may be, for example, an OpenPGP (Pretty Good Privacy) message or an S/MIME (Secure/Multipurpose Internet Mail Extensions) message. If a new member is subsequently added to a group, the group encryption subsystem 108 may send the previously encrypted content and the previously encrypted session key to the new member.

The group decryption subsystem 110 is responsible for receiving a message with encrypted content and an encrypted session key from a sender, and decrypting the encrypted content. In particular, as will be discussed in more detail below, the group decryption subsystem 110 first determines whether the encrypted session key should be decrypted with a private key of a user or a private key of a group. If the encrypted session key should be decrypted with a private key of the user, the group decryption subsystem 110 decrypts the encrypted session key using the private key of the user, and then decrypts the encrypted content using the decrypted session key. If the encrypted session key should be decrypted with a private key of the group, the group decryption subsystem 110 sends a request to the server 106 to decrypt the encrypted session key, receives a response from the server 106, obtains the session key using the server response, and decrypts the encrypted content using the session key.

The server 106 hosts a group proxy 112 that assists members of different groups in decrypting session keys used for encryption of secure content distributed to these groups. The group proxy 112 has access to a membership store that includes data identifying members of various groups. The membership store 116 may reside on a local storage device of the server 106 or an external storage device that is accessible to the group proxy 112 via the network 102. As will be discussed in more detail below, the group proxy 112 determines whether a user requesting decryption is a member of a group using data in the membership store 116. If not, the group proxy 112 denies the decryption request. If so, the group proxy 112 decrypts the encrypted session key received from the requesting client, and extracts the session key. In one embodiment, the group proxy 112 sends the session key to requesting client 104 using a secure communication protocol. In another embodiment, the group proxy 112 re-encrypts the session key using a public key of the user and sends the re-encrypted session key to the requesting client 104, eliminating the need to use a secure communication protocol. The client then decrypts the re-encrypted session key using a corresponding private key of the user, and decrypts the content using the decrypted session key.

It should be noted that the encryption and decryption operations discussed herein may be performed using, for example, the OpenPGP protocol, the S/MIME protocol, or any other cryptographic protocol.

Figure 2:
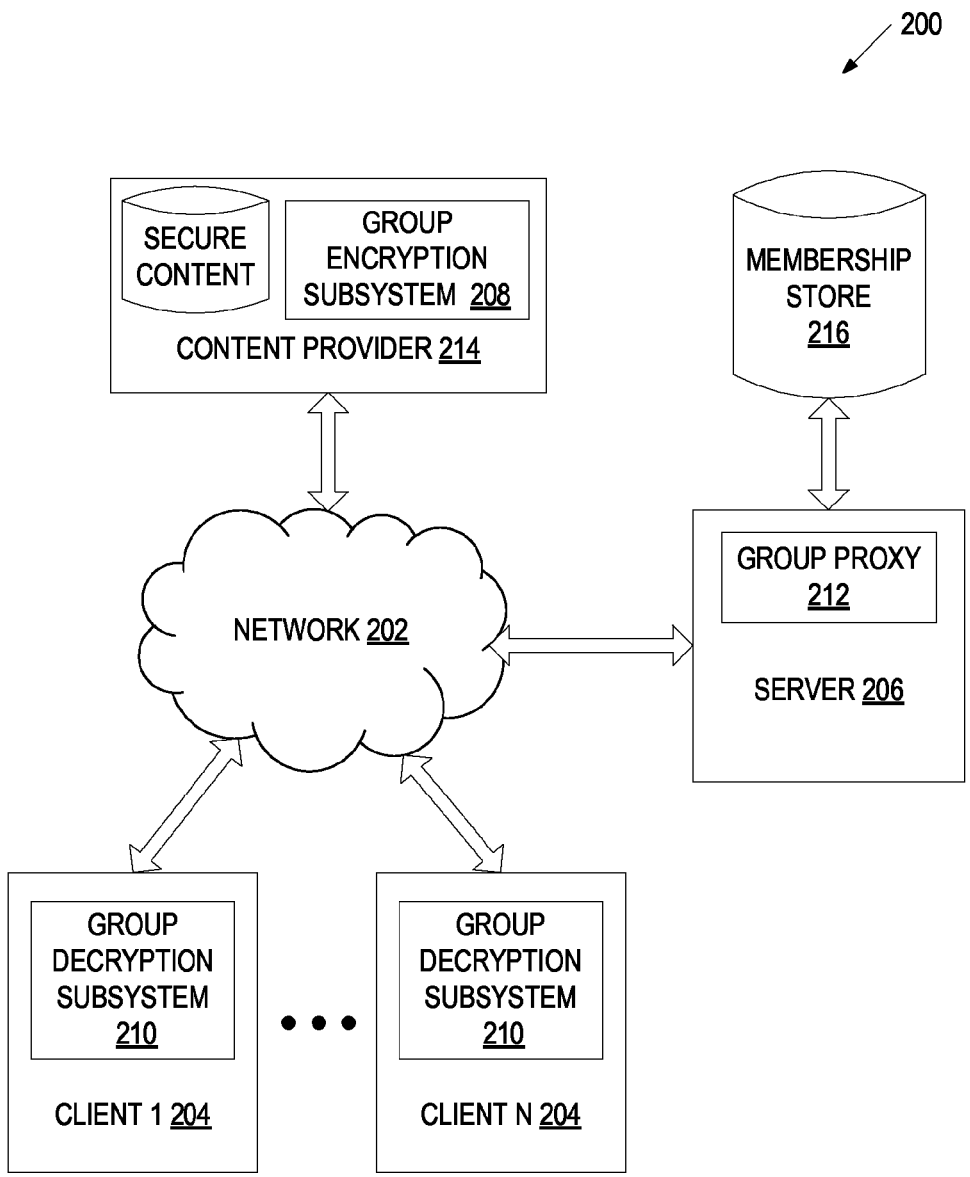
FIG. 2 illustrates another exemplary network architecture in which embodiments of the invention may operate.

FIG. 2 is a block diagram of an exemplary network architecture 200, in which embodiments of the present invention may operate. The architecture 100 includes multiple client devices 204, a content provider 214 and a server 206 connected via a network 202. The network 202 may be a private network (e.g., local area network (LAN), wide area network (WAN), metropolitan area network (MAN), etc.), a public network (such as the Internet), or a combination thereof.

The content provider 214 may be a file server, a database server (e.g., an LDAP server), a social network website, a cloud service provider, a web forum website, a networked computer providing virtual drives or network shares, or any other system hosting content or controlling access to the content that can be remotely accessed from clients 104. The content provider 214 may include one or more machines such as server computers, desktop computers, etc. The server 206 may be a server computer system, a desktop computer system, a router, etc. In some embodiments, the content provider 214 and server 206 are separate computer systems. In other embodiments (not shown), the server 206 is part of the computer system of the content provider 214.

Each client 204 may be a personal computer (PC), a laptop, a tablet computing device, a mobile phone, or any other computing device. A user of client 204 is a member of one or more groups that are authorized to access secure content stored on the content provider 214. The secure content may be contained in one or more files, a virtual drive, a network share, etc. Each client 204 may store a public key for each group of the user but not a corresponding private key. In addition, each client 204 stores one or more personal key pairs of the user.

In one embodiment, the content provider 214 includes a group encryption subsystem 208 to encrypt content to be accessible to the group. The group encryption subsystem 208 is responsible for identifying secure content to be accessible to a group, encrypting this content with a session key, and encrypting the session key with a public key of the group. In one embodiment, when the group encryption subsystem 208 encrypts the session key, it sends a message (e.g., an email message, a web mail message, etc.) with the encrypted session key to the group. In one embodiment, the group encryption subsystem 208 stores a list of members for each group and associates groups with corresponding content. If a new member is subsequently added to a group, the group encryption subsystem 208 sends the encrypted session key to the new member. In another embodiment, the group encryption subsystem 208 generates a new session key each time the membership of the group changes, encrypts the content with the new session key, encrypts the new session key with the public key of the group, and re-sends the encrypted session key to the group (e.g., using an email address for the group). In yet another embodiment, the group encryption subsystem 208 periodically generates a new session key, encrypts the content with the new session key, encrypts the new session key with the public key of the group, and re-sends the encrypted public key to the group.

In another embodiment, the group encryption subsystem 208 does not distribute the encrypted session key to the group. Rather, the group encryption subsystem 208 stores the encrypted session key and sends it to an individual member with encrypted content when the member requests the encrypted content from the content provider 214.

Each client 204 hosts a group decryption subsystem 210 that is responsible for receiving a message with an encrypted session key from the content provider 214, and determining whether the encrypted session key should be decrypted with a private key of the user of the client 204 or with a private key of a group. If the encrypted session key should be decrypted with a private key of the user, the group decryption subsystem 210 decrypts the encrypted session key using the private key of the user. If the encrypted session key should be decrypted with a private key of the group, the group decryption subsystem 210 sends a request to the server 206 to decrypt the encrypted session key, receives a response from the server 206, obtains the session key using the server response, and decrypts the encrypted content using the session key. The group decryption subsystem 210 may have received the encrypted content along with the encrypted session key from the content provider 214, or it may need to send a separate request for the encrypted content to the content provider 214.

The server 206 hosts a group proxy 212 that assists members of different groups in decrypting session keys used for encryption of secure content distributed to these groups. The group proxy 212 has access to a membership store 216 that includes data identifying members of various groups. The membership store 216 may reside on a local storage device of the server 206, on a storage device of the content provider 214 accessible to the group proxy 212 via the network 202, or on a different storage device that is accessible to the group proxy 212 via the network 102.

As will be discussed in more detail below, the group proxy 212 determines whether a user requesting decryption is a member of a group using data in the membership store 216. If not, the group proxy 212 denies the decryption request. If so, the group proxy 212 decrypts the encrypted session key received from the requesting client, and extracts the session key. In one embodiment, the group proxy 212 sends the session key to requesting client 204 via a secure communication channel. In another embodiment, the group proxy 212 re-encrypts the session key using a public key of the user and sends the re-encrypted session key to the requesting client 204, eliminating the need for a secure communication channel. The client 204 then decrypts the re-encrypted session key using a corresponding private key of the user, and decrypts the content using the decrypted session key.

Figure 3:
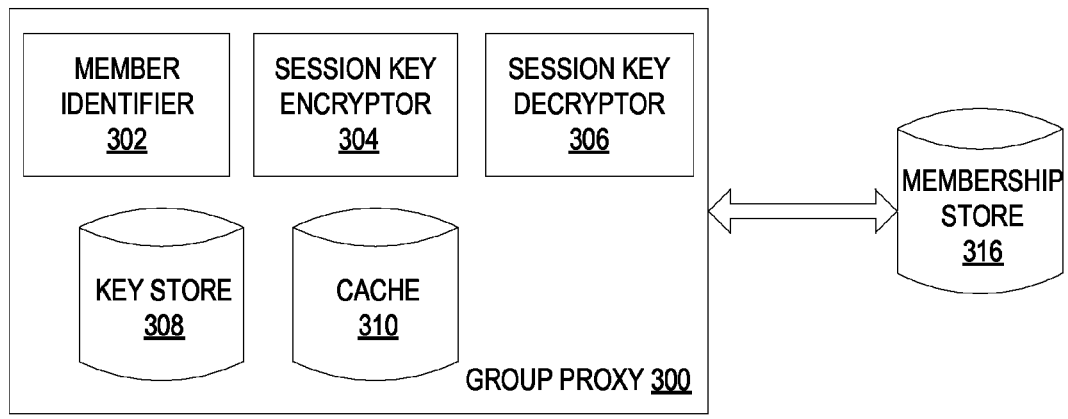
FIG. 3 is a block diagram of one embodiment of a group proxy.

FIG. 3 is a block diagram of one embodiment of a group proxy 300. The group proxy may include a member identifier 302, a session key encryptor 304, a session key decryptor 306, a key store 308, and a cache 310. Alternatively, the group proxy 300 may include a subset of these components. It should be noted that the individual components included in the group proxy 300 are merely examples of modules for one embodiment of the present invention. The functions of these components may be combined. Additionally, the functions of one or more of these components may not be performed in some embodiments of the present invention.

The key store 308 includes identifiers of keys (KeyIDs) assigned to different groups and corresponding private keys or private/public key pairs of these groups. A membership store 316 accessible to the group proxy 300 (locally or via a network) identifies members of each group using KeyIDs of groups and identifying information of users (members of a group). Identifying information of a user may be, for example, a KeyID of the user, an email address of the user, the user ID, an IP address of the client device, an employee number of the user, or any other information uniquely identifying the user. The key store 308 and the membership store 316 may represent a single data structure or multiple data structures (databases, repositories, files, etc.) residing on one or more mass storage devices, such as magnetic or optical storage based disks, solid-state drives (SSDs) or hard drives.

The member identifier 302 receives a message from a client that includes identifying information of a user of the client and an encrypted session key for secure content. The member identifier 302 determines whether the user is a member of a group for which the session key was encrypted. In one embodiment, the member identifier 302 examines the encrypted session key to extract the KeyID of the group, searches the membership store 316 to find records for the KeyID of the group, and determines whether any of the found records associate the KeyID of the group with identifying information of the user (e.g., the KeyID of the user public key). If not, the member identifier 302 sends an error message to the client (e.g., an error code signifying that the decryption request is denied because the user is not a member of the group). If the member identifier 302 finds a record in the membership store that associates the KeyID of the group with the identifying information of the user, the member identifier 302 invokes the session key decryptor 306.

The session key decryptor 306 searches the key store 308 for a private key of a group represented by the group KeyID, decrypts the encrypted session key using the private key of the group, and extracts the session key. In one embodiment, when the session key decryptor 306 decrypts the encrypted session key for the first time, it stores the extracted session key in the cache 310. Subsequently, when a decryption request for the same encrypted session key is received from a client, the session key decryptor 306 retrieves the session key from the cache, without performing an expensive decryption operation.

The session key encryptor 304 re-encrypts the session key using a public key of the user and sends the re-encrypted session key to the client. The public key of the user may be part of the user identifying information received from the client or stored on the server in association with the user identifying information (e.g., in the membership store 316). Alternatively, the session key encryptor 304 may setup a secure channel with the client and transmit the session key to the client via the secure channel.

Accordingly, the group proxy 300 decrypts an encrypted session key for any user who is currently recorded in the membership store 316 as a member of a group for which the session key was encrypted. If a new member is added to the group, the membership store 316 will be updated accordingly, and the group proxy 300 will decrypt the encrypted session key for the new member when requested by the new member.

Figure 4:
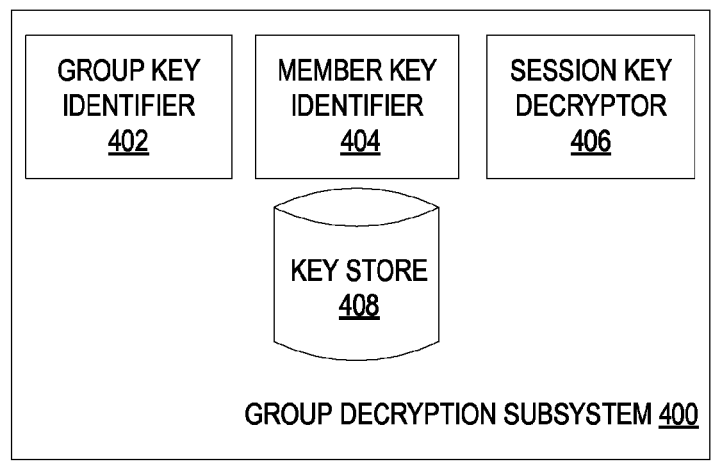
FIG. 4 is a block diagram of one embodiment of a group decryption subsystem.

FIG. 4 is a block diagram of one embodiment of a group decryption subsystem 400. The group decryption system 400 may include a group key identifier 402, a member key identifier 404, a session key decryptor 406, and a key store 408. Alternatively, the group decryption subsystem 400 may include a subset of these components. It should be noted that the individual components included in the group decryption subsystem 400 are merely examples of modules for one embodiment of the present invention. The functions of these components may be combined. Additionally, the functions of one or more of these components may not be performed in some embodiments of the present invention.

The key store 408 includes various keys for encrypting and decrypting content for the user. In particular, the key store 408 may include personal keys (public/private key pairs) of the user and public keys of groups to which the user is a represent a single data structure or multiple data member. The key store 408 may structures (databases, repositories, files, etc.) residing on one or more mass storage devices, such as magnetic or optical storage based disks, solid-state drives (SSDs) or hard drives.

The group key identifier 402 receives a message with an encrypted session key from a content provider or another client, and searches the message for a KeyID that matches any of the user's private keys in the key store 408. If the group key identifier 402 finds a matching private key, it invokes the session key decryptor 406 to decrypt the session key using the private key. If the key store 408 does not include a matching private key of the user, the group key identifier 402 searches the message for a KeyID that matches any of the group public keys in the key store 408. A group public key includes the address of a server that has a private key of the group. For example, a group public key may include a notation packet with a tag whose value contains the URL of the server.

If a matching group public key is found in the key store 408, the member key identifier 404 determines which identifying information of the user (e.g., a user key, a user email address, a user employee number, etc.) is used for the user's membership in the group represented by the found group public key. In one embodiment, the member key identifier 404 uses an out-of-band database to identify the user's identifying information (e.g., a user key, a user email address, a user employee number, etc.) used for the user's membership in the group. In another embodiment, a group public key is previously signed by the user's private key used for group membership in a non-exportable mode in accordance with the OpenPGP standard (see The OpenPGP Working Group of the Internet Engineering Task Force (IETF) Proposed Standard RFC 4880, Section 5.2.3.11). In this other embodiment, member key identifier 408 determines which user key is used for the user's membership in the group by searching the found group public key for a non-exportable certificate signature that indicates which user key represents the group member.

The session key decryptor 404 generates a message including the encrypted session key and the user's identifying information (e.g., the user's public key representing the user's membership in the group), sends the message to the server identified in the group public key, and obtains the session key using a response received from the server. In one embodiment, the server decrypts the encrypted session key, extracts the session key and sends the extracted session key to the client via a secure communication channel. Alternatively, the server re-encrypts the extracted session key using the user's public key, and sends the re-encrypted session key to the client, where the session key decryptor 406 decrypts the re-encrypted session key using a corresponding private key of the user.

Upon obtaining the session key, the session key decryptor 406 decrypts the secure content using the session key. In one embodiment, the secure content was previously received by the client along with the encrypted session key. In another embodiment, the client sends a separate request for the secure content to the content provider (e.g., upon decrypting the encrypted session key or at any other time).

Figure 5:
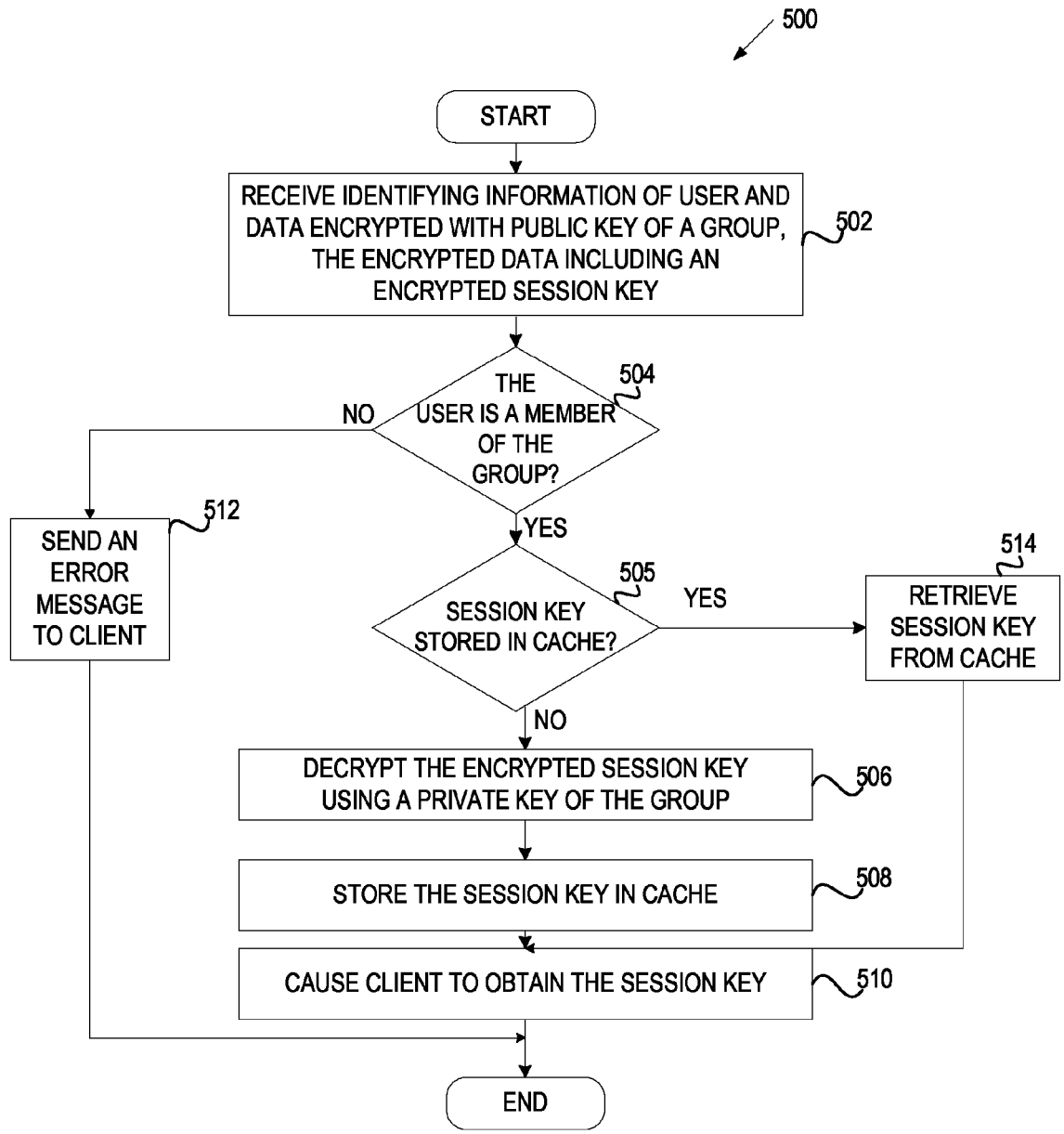
FIG. 5 is a flow diagram of one embodiment of a server-based session key decryption method to secure content in a one-to-many relationship.

FIG. 5 is a flow diagram of one embodiment of a server-based session key decryption method 500 to secure content in a one-to-many relationship. The method 500 is performed by processing logic that may comprise hardware (circuitry, dedicated logic, etc.), software (such as is run on a general purpose computer system or a dedicated machine), or a combination of both. The method 500 may be performed by a server 106 of FIG. 1 or server 206 of FIG. 2.

Referring to FIG. 5, method 500 starts with a server receiving a message from a client, where the message includes a user's identifying information (e.g., a public key of the user, an email address of the user, etc.) and an encrypted session key (block 502). At block 504, the server determines whether the user of the client is a member of a group for which the session key was encrypted. In one embodiment, the server makes the determination by extracting a group KeyID from the encrypted session key, searching a membership store for the group KeyID, and determining whether any group KeyID records in the membership store include the identifying information of the user (e.g., the KeyID of the user public key).

If the server determines that the user is not a member of the group, the server sends an error message to the client indicating that the user is not a member of the group for which the session key was encrypted (block 512). If the user is a member of the group, the server determines, in one embodiment, whether the session key is stored in a cache (block 505). If so, the server retrieves the session key from the cache (block 514) and causes the client to obtain the session key (block 510). If not, the server decrypts the encrypted session key using a private key of the group stored on the server (block 506), extracts the session key, stores the session key in the cache (block 508), and causes the client to obtain the session key (block 510). In one embodiment, the server causes the client to obtain the session key by re-encrypting the session key using the public key of the user and sending the re-encrypted session key to the client. In another embodiment, the server causes the client to obtain the session key by establishing a secure communication channel with the client and sending the session key via the secure communication channel.

Figure 6:
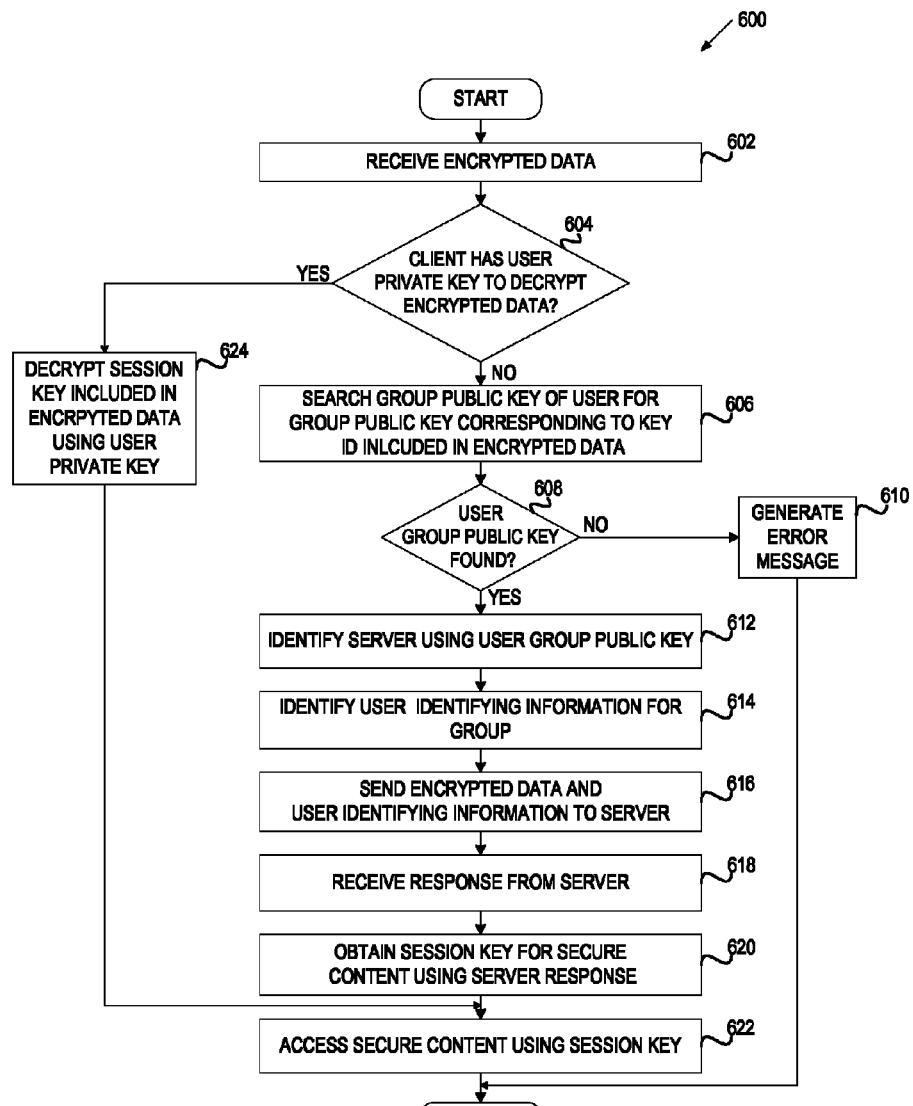
FIG. 6 is a flow diagram of one embodiment of a client-based session key decryption method to secure content in a one-to-many relationship.

FIG. 6 is a flow diagram of one embodiment of a client-based session key decryption method 600 to secure content in a one-to-many relationship. The method 600 is performed by processing logic that may comprise hardware (circuitry, dedicated logic, etc.), software (such as is run on a general purpose computer system or a dedicated machine), or a combination of both. The method 600 may be performed by a client (e.g., client 104 of FIG. 1 or client 204 of FIG. 2).

Referring to FIG. 6, method 600 starts with a client receiving a message that includes an encrypted session key (block 602). In one embodiment, the message also includes secure content encrypted with the session key. Alternatively, the message does not include the encrypted content. The message may be received from a content provider or another client.

At block 604, the client determines whether a key store (a user's keyring) includes a user private key corresponding to a KeyID associated with the encrypted session key from the message (block 604). If so, the client decrypts the encrypted session key using the user private key (block 624) and proceeds to block 622.

If the client does not find any matching private key of the user, the client searches the message for a KeyID that matches any of the group public keys in the key store (606). If a matching group public key is not found, the client generates an error message indicating that the decryption of the session key is denied (block 61). Alternatively, if the client finds a matching group public key, the client identifies a server to decrypt the encrypted session key based on the server information (e.g., the URL of the server) included in the group public key (block 612), and determines which identifying information (e.g., a user key, a user email address, etc.) is used for the user's membership in the group represented by the found group public key (block 614). In one embodiment, the client uses an out-of-band database to identify user identifying information (e.g., a user key, a user email address, etc.) used for the user's membership in the group. In another embodiment, the client determines which user key is used for the user's membership in the group by searching the found group public key for a non-exportable certificate signature that indicates which user key represents the group member.

At block 616, the client generates a message including the encrypted session key and the user's identifying information representing the user's membership in the group, and sends the message to the server identified in the group public key. Subsequently, the client receives a response from the server (block 618), and obtains the session key using the server response (block 620). In one embodiment, the server response includes the decrypted session key. In another embodiment, the server response includes the session key re-encrypted by the user with the user's public key. In this other embodiment, the client decrypts the re-encrypted session key using a corresponding private key of the user.

At block 622, the client decrypts secure content using the session key. In one embodiment, the secure content was previously received by the client along with the encrypted session key. In another embodiment, the client sends a separate request for the secure content to the content provider (e.g., upon decrypting the encrypted session key or at any other time).

Figure 7:
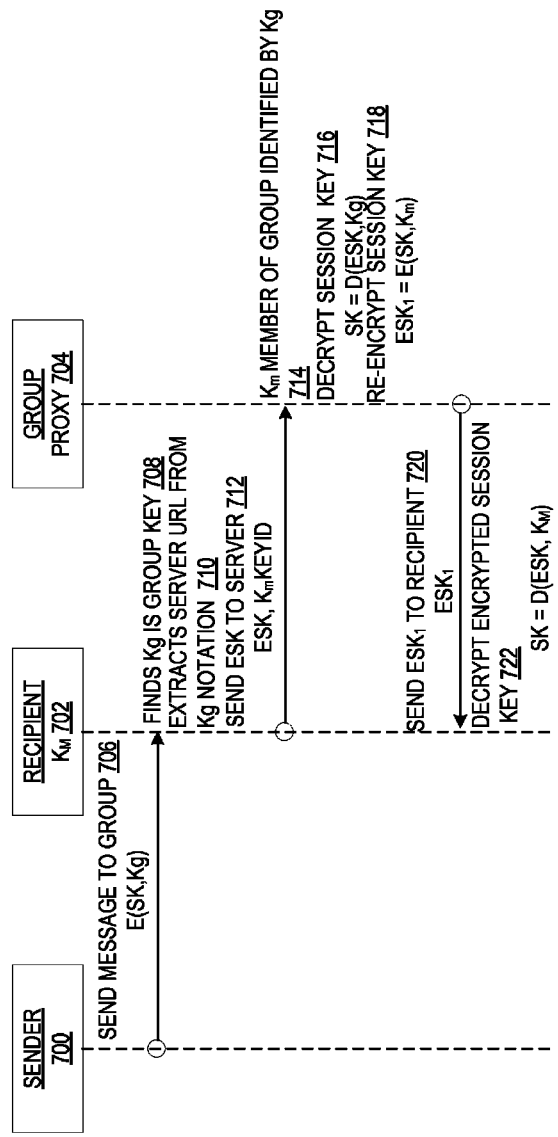
FIG. 7 illustrates the decryption of secure content sent to a group of recipients, in accordance with one embodiment.

FIG. 7 illustrates the decryption of secure content sent to a group of recipients 702 by sender 700, in accordance with one embodiment. In particular, sender 700 encrypts secure content with a session key, encrypts the session key using a public key assigned to a group, and sends a message including the encrypted session key (and optionally the encrypted content) to the group (706). Sender 700 may not know who individual members of the group are and does not need to encrypt the session key for each member of the group individually. Rather, the sender only needs to encrypt the session key once using the public key of the group, thus requiring significantly less memory and processing resources and generating a much smaller message for the recipients. In one embodiment, the sender stores the public key of the group but not a corresponding private key of the group.

Recipient 702 stores one or more public keys for one or more groups to which the recipient is a member, and private key pairs of the recipient's personal keys including key pairs representing the recipient's membership in the groups. The recipient receives the message and determines that the key used to encrypt the session key is a group public key (708). The recipient extracts the server URL from the group public key (710) and sends to the server a message including the encrypted session key and the recipient's public key representing the recipient's membership in the group (712).

Group proxy 704 hosted by the server stores private keys of one or more groups and has access to a database including information about the membership of these groups. When group proxy 704 receives a message from a recipient, it determines, based on the membership database, that the KeyID of the recipient's public key matches a member KeyID for a group identified by the KeyID associated with the encrypted session key (714). Group proxy 704 then decrypts the encrypted session key using the private key of the group (716), re-encrypts the session key using the public key of the recipient (718), and sends the re-encrypted session key to the recipient (720). Group proxy 704 performs the above operations for any member of a group, even if such a member is added to the group at a significantly later time than the other members of the group. In addition, group proxy 704 uses a self authenticating protocol that does not require a recipient to login and/or have an account with the server.

Recipient 702 receives the re-encrypted session key from group proxy 704 and decrypts the re-encrypted session key using a private key of the key pair that represents the membership of recipient 702 in the group (722). Recipient 702 then decrypts the secure content using the session key.

Figure 8:
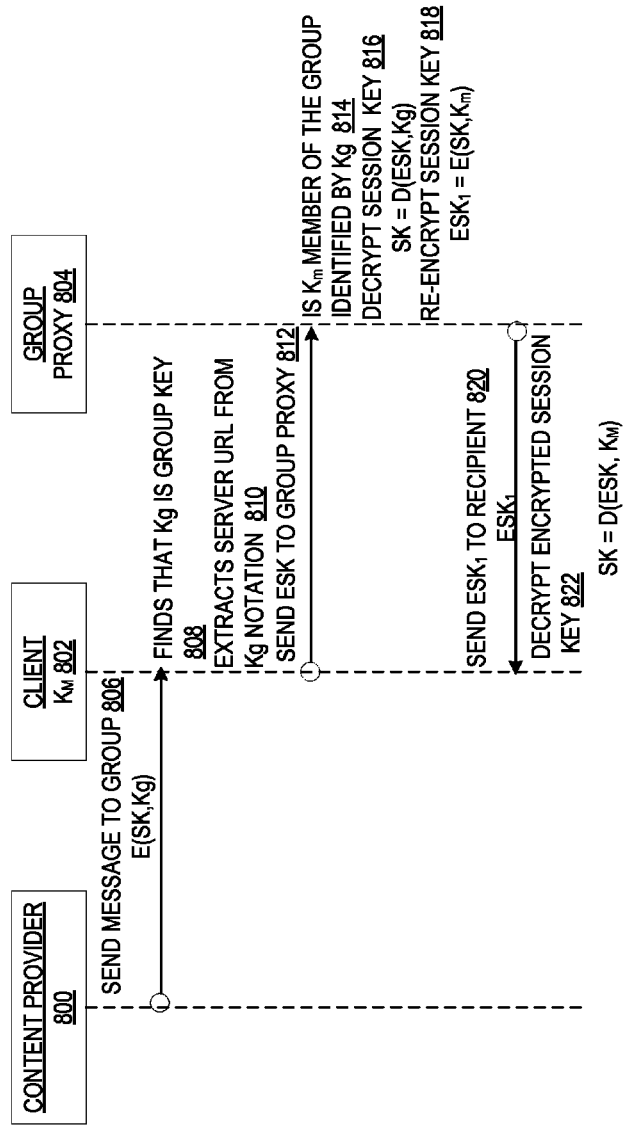
FIG. 8 illustrates restricting access to content maintained by a content provider to members of a group, in accordance with one embodiment.

FIG. 8 illustrates restricting access to content maintained by content provider 800 to members of a group, in accordance with one embodiment. Content provider 800 may be a file server, a database server (e.g., an LDAP server), a social network website, a cloud service provider, a web forum website, a networked computer providing virtual drives or network shares, or any other system hosting content or controlling access to the content that can be remotely accessed from clients 802.

Content provider 800 encrypts secure content with a session key, encrypts the session key using a public key assigned to a group, and sends a message including the encrypted session key (and optionally the encrypted content) to the group (806). Content provider 800 may or may not know who individual members of the group are and does not need to encrypt the session key for each member of the group individually. Rather, content provider 800 only needs to encrypt the session key once using the public key of the group, thus requiring significantly less memory and processing resources and generating a much smaller message for the clients.

Client 802 stores one or more public keys for one or more groups to which a user of client 802 is a member, and private key pairs of the user's personal keys including key pairs representing the user's membership in the groups. Client 802 receives the message and determines that the key used to encrypt the session key is a group public key (808). Client 802 extracts the server URL from the group public key (810) and sends to the server a message including the encrypted session key and the user's public key representing the user's membership in the group (812).

Group proxy 804 hosted by the server stores private keys of one or more groups and has access to a database including information about the membership of these groups. When group proxy 804 receives a message from client 802, it determines, based on the membership database, that the KeyID of the user's public key matches a member KeyID for a group identified by the KeyID associated with the encrypted session key (814). Group proxy 804 then decrypts the encrypted session key using the private key of the group (816), re-encrypts the session key using the public key of the user (818), and sends the re-encrypted session key to the user (820).

Client 802 receives the re-encrypted session key from group proxy 804 and decrypts the re-encrypted session key using a private key of the key pair that represents the membership of the user to the group (822). Client 802 then decrypts the secure content using the session key.

Figure 9:
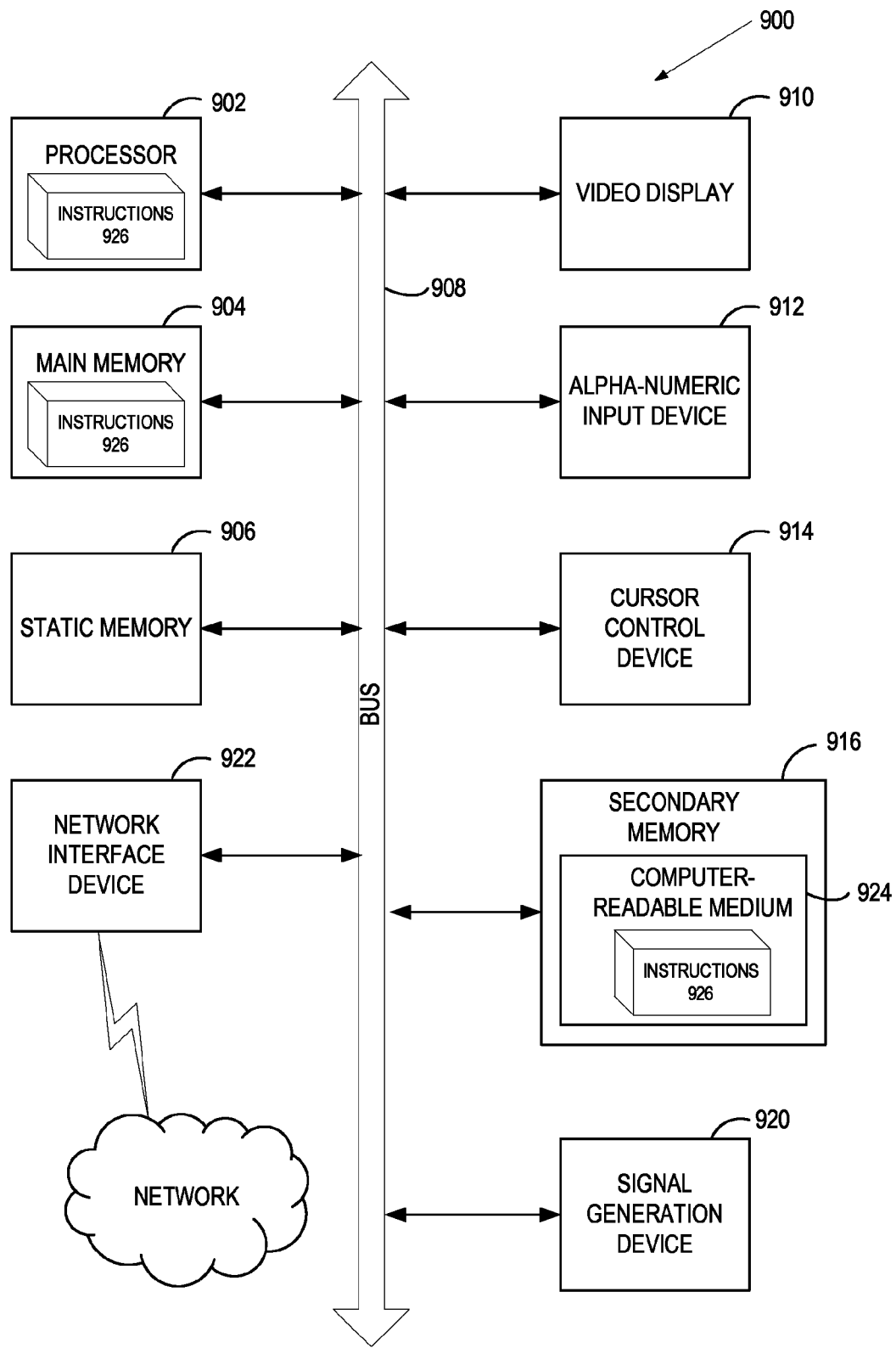
FIG. 9 is a block diagram of an exemplary computer system that may perform one or more of the operations described herein.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 916 (e.g., a data storage device), which communicate with each other via a bus 908.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute instructions 926 (e.g., of group encryption subsystem 108 or 208, and/or group decryption subsystem 110 or 210, and/or group proxy 112 or 212) for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The secondary memory 916 may include a machine-readable storage medium (or more specifically a computer-readable storage medium) 924 on which is stored one or more sets of instructions 926 (e.g., of group encryption subsystem 108 or 208, and/or group decryption subsystem 110 or 210, and/or group proxy 112 or 212) embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

The machine-readable storage medium 924 may also be used to store the group decryption subsystem 110 or 210, and/or group proxy 112 or 212, and/or a software library containing methods that call group decryption subsystem and/or the group proxy. While the machine-readable storage medium 924 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "encrypting", "decrypting", "sending" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

We claim:

1. A computer-implemented method comprising:
receiving, by a server, identifying information for a user of a client device and data encrypted with a public key of a group, wherein the encrypted data includes an encrypted session key for secure content, the encrypted session key being encrypted with the public key of the group, and wherein the public key of the group comprises an address of the server having a private key of the group;
determining, by the server, whether the user is a member of the group using the identifying information of the user;
upon determining, by the server, that the user is a member of the group, decrypting, by the server, the encrypted session key using the private key of the group, and causing the client device to obtain a decrypted session key to access the secure content;
if the user is not a member of the group, refraining from decrypting the encrypted session key; and
upon determining that a new member has been added to the group, sending the encrypted session key for the secure content to the new member, wherein the new member is to decrypt the encrypted content post-factum.

2. The method of claim 1 wherein causing the client device to obtain the decrypted session key comprises:
   re-encrypting, by the server, the session key using a public key of the user; and
   sending the re-encrypted session key to the client device, the re-encrypted session key to be decrypted using a private key of the user.

3. The method of claim 1 wherein determining whether the user is the member of the group comprises:
   determining an identifier of a group key representing the group; and
   determining whether identifiers of members of the group include an identifier matching the identifying information of the user.

4. The method of claim 1 further comprising:
   after decrypting the encrypted session key, extracting the decrypted session key and storing the decrypted session key in a cache;
   receiving the encrypted session key from another user;
   determining that the other user is a member of the group;
   retrieving the decrypted session key from the cache; and
   causing the other user to obtain the decrypted session key to access the secure content.

5. The method of claim 1 wherein the secure content is any one of an electronic message, an attachment of the electronic message, a file, a virtual disk, a network share, web forum content, social network content, and cloud content.

6. The method of claim 1 wherein the identifying information of the user comprises at least one of a public key of the user, an email address of the user, an identifier of the user, an internet protocol (IP) address of the client device, and an employee number of the user.

7. A non-transitory computer readable medium including instructions that, when executed by a computing device, cause the computing device to perform operations comprising:
   receiving encrypted data at a client device;
   determining that the encrypted data includes a key identifier matching an identifier of a group public key stored on the client device, wherein the group public key comprises an address of at least one server that comprises a group private key;
   identifying the at least one server having the group private key for the encrypted data, the encrypted data including an encrypted session key for secure content, the encrypted session key being encrypted with group public key;
   sending the encrypted data and identifying information of a user of the client device to the server;
   receiving a response from the server;
   obtaining a decrypted session key using the response of the server when the user is an existing member of the group or a new member of the group; and
   decrypting the secure content using the decrypted session key.

8. The non-transitory computer readable medium of claim 7 wherein determining that the encrypted data includes the key identifier matching the identifier of the group public key stored on the client device comprises:
   determining that the client device does not include a user private key corresponding to the key identifier included in the encrypted data; and
   searching group public keys of the user for a group public key corresponding to the key identifier included in the encrypted data.

9. The non-transitory computer readable medium of claim 7 wherein the operations further comprise:
   identifying a public key of the user for a group represented by the group public key.

10. The non-transitory computer readable medium of claim 7 wherein:
    the response of the server includes the session key re-encrypted by the server using a public key of the user; and
    obtaining the session key using the response of the server comprises decrypting the re-encrypted session key using a private key of the user.

11. The non-transitory computer readable medium of claim 7 wherein the secure content is any one of an email message, an attachment to the email message, a file, a virtual disk, a network share, web forum content, social network content, and cloud content.

12. The non-transitory computer readable medium of claim 7 wherein the identifying information of the user comprises at least one of a public key of the user, an email address of the user, an identifier of the user, an internet protocol (IP) address of the client device, and an employee number of the user.

13. A system comprising:
    a hardware server comprising a central processing unit, the server to receive identifying information for a user of a client device and data encrypted with a public key of a group, wherein the encrypted data includes an encrypted session key for secure content, the encrypted session key being encrypted with the public key of a group, wherein the public key of the group comprises an address of the server having a private key of the group, to determine that the user is a member of the group using the identifying information of the user, to decrypt the encrypted session key using a private key of the group upon determining that the user is a member of the group, to cause the client device to obtain a decrypted session key to access the secure content, and to send the encrypted session key for the secure content upon determining that a new member has been added to the group, wherein the new member is to decrypt the encrypted content postfactum.

14. The system of claim 13 wherein the server is to cause the client device to obtain the decrypted session key by:
    re-encrypting, by the server, the session key using a public key of the user; and
    sending the re-encrypted session key to the client device, the re-encrypted session key to be decrypted using a private key of the user.

15. The system of claim 13 wherein the secure content is any one of an electronic message, an attachment of the electronic message, a file, a virtual disk, a network share, web forum content, social network content, and cloud content.

16. The system of claim 13 wherein the identifying information of the user comprises at least one of a public key of the user, an email address of the user, an identifier of the user, an IP address of the client device, and an employee number of the user.

17. The system of claim 13 further comprising:
    a client device to receive encrypted data, to determine that the encrypted data includes a key identifier matching an identifier of a group public key stored on the client device, to identify the server, to send the encrypted data and the identifying information of the user to the server, to receive a response from the server, to obtain the decrypted session key using the response of the server, and to decrypt the secure content using the decrypted session key.

18. The system of claim 17 wherein the client device is to determine that the encrypted data includes the key identifier matching the identifier of the group public key stored on the client device by:
- determining that the client device does not include a user private key corresponding to the key identifier included in the encrypted data; and
- searching group public keys of the user for a group public key corresponding to the key identifier included in the encrypted data.

19. The method of claim 1 further comprising:
- generating a new session key after a change in a membership of the group;
- encrypting the secure content with the new session key;
- encrypting the new session key with the public key of the group; and
- sending the new encrypted session key to the members of the group.

20. The non-transitory computer readable medium of claim 7 further comprising receiving additional encrypted data at the client device from the server in response to one of: a change in a membership of the group or a newly generated session key.

\* \* \* \* \*